Patented Nov. 26, 1929

1,737,031

UNITED STATES PATENT OFFICE

GEORGE W. STRYKER, OF LOS ANGELES, CALIFORNIA

PHENOL-FORMALDEHYDE CONDENSATION PRODUCT AND METHOD OF MAKING SAME

No Drawing.   Application filed October 1, 1927.   Serial No. 223,488.

This invention relates to and has for a primary object the provision of a new plastic condensite material, particularly useful for the production of artificial dentures and other molded articles, together with a new and improved method for producing the same. Briefly described my improved material and method comprehends the combination of phenol and formaldehyde by measure from two to one to three to five parts of formaldehyde to one of phenol mixed in the presence of a catalyzing agent which by the interaction of each of said elements for a period of approximately eighty hours when heated to a temperature of from 118 to 134 degrees F. and freely agitated produces a non-stratified anhydrous, soluble, resinous material due to the evaporation, polymerization, condensation and dehydration of the same. The resultant mass forms a thick, sticky, soluble syrup which must be further treated as follows: A given quantity of the resinous mass is placed in a receptacle and subjected to a temperature ranging from 180 to 200 degrees F. at which temperature it is maintained for approximately four or five hours during which time it is stirred almost constantly, particularly during the last two hours. To this resinous mass may be added a suitable coloring matter in sufficient quantity.

At the completion of the second heating period materials are capable of being held in suspension due to the thickness of the resin and the resultant resin is still soluble, fusible, and is almost devoid of free phenol and formaldehyde, but is of a density permitting its being handled without sticking. Subsequently the resin is allowed to cool after which it assumes a substantially permanent plastic state and is capable of being molded into squares or slabs of suitable form and is adapted for commercial use in production of artificial dentures, teeth, casts, dies, molds, etc.

It is a matter of general knowledge that artificial dentures have heretofore been made almost exclusively of rubber or vulcanite. Dentures made of such material have been found undesirable for many reasons which are well known to the dental profession.

In order to overcome the objections to the obtaining dentures, I have sought to provide a dense material which may be readily produced in small or large quantities, by the combination of well known chemicals so that the material may be supplied to the trade in a plastic state and molded into form by means of the usual flasks and plaster casts, and thereafter finally cured and hardened by heat and pressure so as to provide substantially indestructible dentures.

Such a material when produced in accordance with the hereinafter described method will provide a material which is odorless, tasteless and practically impervious to oral secretions, and will at the same time simulate as nearly as possible the natural hues or tints of the gum tissues. The material is a conductor of heat, is non-inflammable, and of sufficient strength and rigidity to withstand all stresses created in the process of mastication.

In addition to the above objects it is also an object to provide a material which is readily capable of being relined, repaired or rebased, which will provide dentures of lighter weight more readily made than, and in all respects superior to dentures made of other materials and by other methods.

In the consideration of my invention it may be understood that I am well aware that other condensite materials embodying similar or the same chemicals or elements have been known and used for other purposes, such for instance as bakelite which is used extensively for industrial purposes. Such condensites, however, are incapable of the treatment and may not be used for the purpose of making artificial dentures, nor are the methods employed in making the same similar to those employed by me in the production of my new composition.

I am enabled to produce the results set forth herein in the form of a plastic condensite material by an improved technique and method in the production of the material, rather than by the employment of new elements or agencies embodied in the formula.

Nearly all condensites have as a base the combination of phenol and formaldehyde, in the presence of a suitable catalytic agent, which by a process of evaporation and precipitation produces a resin that is usually supplied to the trade in powdered form. The powder is then placed in molds and subjected to high temperatures and high pressures and is used principally for insulating material and other kindred purposes.

I have found that by combining phenol and formaldehyde in certain substantially definite proportions, and varying the evaporation, polymerization and curing methods substantially from that used in other condensite materials, I am enabled to produce a plastic material which will retain its state of plasticity for a substantial period of time, and is readily adapted to be employed in dental casts of plaster, artificial stone or the like, and molded into form for producing a dense, hard and practically indestructible material for the production of artificial dentures.

My improved method consists in initiating the preparation of the material by the admixture of formaldehyde in liquid paste or powdered state, and carbolic acid which has first been liquefied from a crystal state, with the addition of a suitable catalytic agent of either acid or alkaline character. I prefer to use ammonia as a catalyzer as it is readily obtainable and is thoroughly effective for combining the phenol and carbolic acid.

The proportions of the above ingredients are substantially as follows:
Formaldehyde _____ 48 parts.
Carbolic acid (phenol) ____ 24 to 32 parts.
Ammonia _____ 1 part.

The preparation of phenol and formaldehyde may vary from two parts of formaldehyde to one of phenol to five parts of formaldehyde to three of phenol.

The liquid thus formed is then placed in an open receptacle and subjected to heat of 118 to 134 degrees Fahrenheit for a period of four or five days, in order that the aqueous matter may be completely evaporated and a resin formed.

Because of the fact that the fumes given off from the liquid are irritating to the membranes of the nose, throat and eyes, I prefer to place the receptacle containing the liquid in a closed oven which may be vented to the atmosphere for disseminating the fumes at points remote to the laboratory or place of manufacture.

During the polymerization and evaporation period the liquid is freely agitated at intervals, for preventing stratification and maintaining the ingredients in suspension. At the end of the initially heating period the material will assume the consistency of a thick syrup, at which time the material is in readiness for the final curing step of the process.

In order that the completed material may possess the proper hue or tint corresponding to the natural tint of the gum tissues, I may add a coloring agent to the material while in liquid form, or after the same has been reduced to the consistency of a thick syrup, depending upon the kind of coloring agent employed. I prefer, however, to use a mineral dye, in which case the coloring agent is added to and thoroughly mixed with the mixture while in a liquid state, previous to the precipitating and evaporating period.

The dye usually employed is of a deep pink or light red tint, and may be used in the proportions of substantially one grain of dye to the total volume of liquid of two and one-half gallons, or thereabouts, in accordance with the formula hereinabove set out.

If a pigment coloring agent is used in lieu of the mineral dye, the pigment is added at the end of the precipitation period, so that the same will not settle to the bottom of the receptacle containing the liquid, and will be thoroughly distributed through the volume of material when the material is in the form of a thick syrup.

Following the evaporation period the thick material is placed in an open receptacle over a suitable heater for a period of from three to five hours, where it is held at a temperature of 180 to 200 degrees Fahrenheit, during which period the material is frequently, if not quite continuously, agitated. During this final period the material is further polymerized and is reduced to a condition in which it is capable of being readily handled.

At the end of the curing operation the material is then allowed to cool, while open to the atmosphere, and will assume a plastic state, capable of being molded into squares or other desired forms for supply to the trade. The finished material thus produced will ordinarily retain its state of plasticity for a period of several months, especially if kept at reasonably low temperatures.

The finished material may then be substituted for rubber or other materials which are usually molded into form by a vulcanizing process in plaster molds in dental laboratories, for producing artificial dentures.

In this connection it may be observed that my material is capable of being molded in the usual dental flasks and plaster casts at reasonably low pressures and correspondingly low temperatures. It is well known that the plaster casts employed by dentists are incapable of withstanding the high pressures and temperatures necessary to mold other condensite material such as bakelite, but my material, due to the particular method of producing the same as hereinbefore described, may be effectively molded into the form of dentures by means of the ordinary dental flasks and casts, at a pressure of ninety pounds, more or less, to the square inch, and at a temperature far less than that required for the molding of other condensite materials, but always less than 300 degrees Fahrenheit.

In the molding process it is desirable to employ alcohol in lieu of water which is used in the vulcanizing of rubber in dental laboratories, for the reason that the boiling point of alcohol is 170 degrees, whereas that of water is 212 degrees, thus providing more pressure at a given temperature than is possible with water; also water coming in contact with the material during the curing of same may cause discoloration. In all cases the temperature of the molds is to be kept below three hundred degrees Fahrenheit, so that the coloring agents employed in the material will not deteriorate and the delicate tints will not be impaired.

When constructed in accordance with the hereinbefore described method and technique, and substantially in accordance with the formula hereinabove set out, dentures made of my material will be hard, odorless, tasteless, impervious, non-inflammable and non-porous, and will more nearly correspond to the natural tints of the gum tissues than other materials. Also, the material after the hardening process is not susceptible to change by the application of moderate heat.

Dentures made of my material possess a true life-like appearance, and the tints thereof may be made to correspond more closely to the tints of the gum tissues by providing materials in two or three different tints, such for instance as light, medium and dark.

It will be readily apparent to those familiar with the art of production of condensite materials, and of artificial dentures, that my material and the method of making the same lends itself more readily to the variety of requirements for dental bases, and is eminently more satisfactory than other materials for the same purpose.

What I claim is:

1. A condensite material formed of formaldehyde and phenol combined in the presence of a catalizer and heated at a temperature ranging from not below 118 to not above 134 degrees F., such temperatures being effective for eliminating the aqueous elements, the heating being maintained for such a length of time as will insure the prevention of stratification.

2. A condensite material formed of formaldehyde and phenol combined in the presence of a catalizer and heated at a temperature ranging from not below 118 to not above 134 degrees F., such temperatures being effective for eliminating the aqueous elements, the heating being maintained for such a length of time as will insure prevention of stratification, the resultant resin being heated at a temperature ranging from 180 to 200 degrees F. for a period of time sufficient to reduce the resin to a plastic state.

3. A condensite material formed of formaldehyde and phenol with the formaldehyde predominating and heated at a temperature ranging from not below 118 to not above 134 degrees F., such temperatures being maintained for a period of time effective for eliminating the aqueous elements sufficiently fast to insure the prevention of stratification, the resultant resin having a consistency of thick syrup and subsequently heated at a temperature ranging from 180 to 200 degrees F., for a period of time sufficient to reduce the resin to a plastic state for use.

4. The process of making a condensite material which consists in mixing formaldehyde and phenol in the presence of a catalizer and heating the mixture at a temperature ranging from not below 118 to not above 134 degrees F., for a period of time sufficient to eliminate the aqueous elements and prevent stratification.

5. The process of making a condensite material which consists in mixing phenol and formaldehyde in the presence of a catalizer, initially heating the mixture at a temperature ranging from not below 118 to not above 134 degrees F. for a period of time sufficient to completely evaporate the aqueous elements and prevent stratification and for polymerizing the resultant resin, agitating the mixture during the heating period to accelerate evaporation, the resin being thereby reduced to the consistency of a thick syrup, further heating the resin at a temperature ranging from 180 to 200 degrees F. for a period of time sufficient to reduce the resin to a plastic state for use.

6. The process of making a condensite material which consists in mixing a predominating quantity of formaldehyde with phenol in the presence of a catalizer, simultaneously polymerizing and effecting a substantially complete evaporation of the aqueous elements from the mixture by subjecting the mixture to heat at temperatures ranging from not below 118 to not above 134 degrees F. for a period of not exceeding eighty hours, agitating the mixture during the initial heating period to prevent stratification of the elements and to accelerate evaporation, finally heating the resultant resin for a period of four to five hours at a temperature ranging from 180 to 200 degrees F. to effect further polymerization and for reducing the resin to a plastic state.

GEORGE W. STRYKER.